Figures 1, 2:
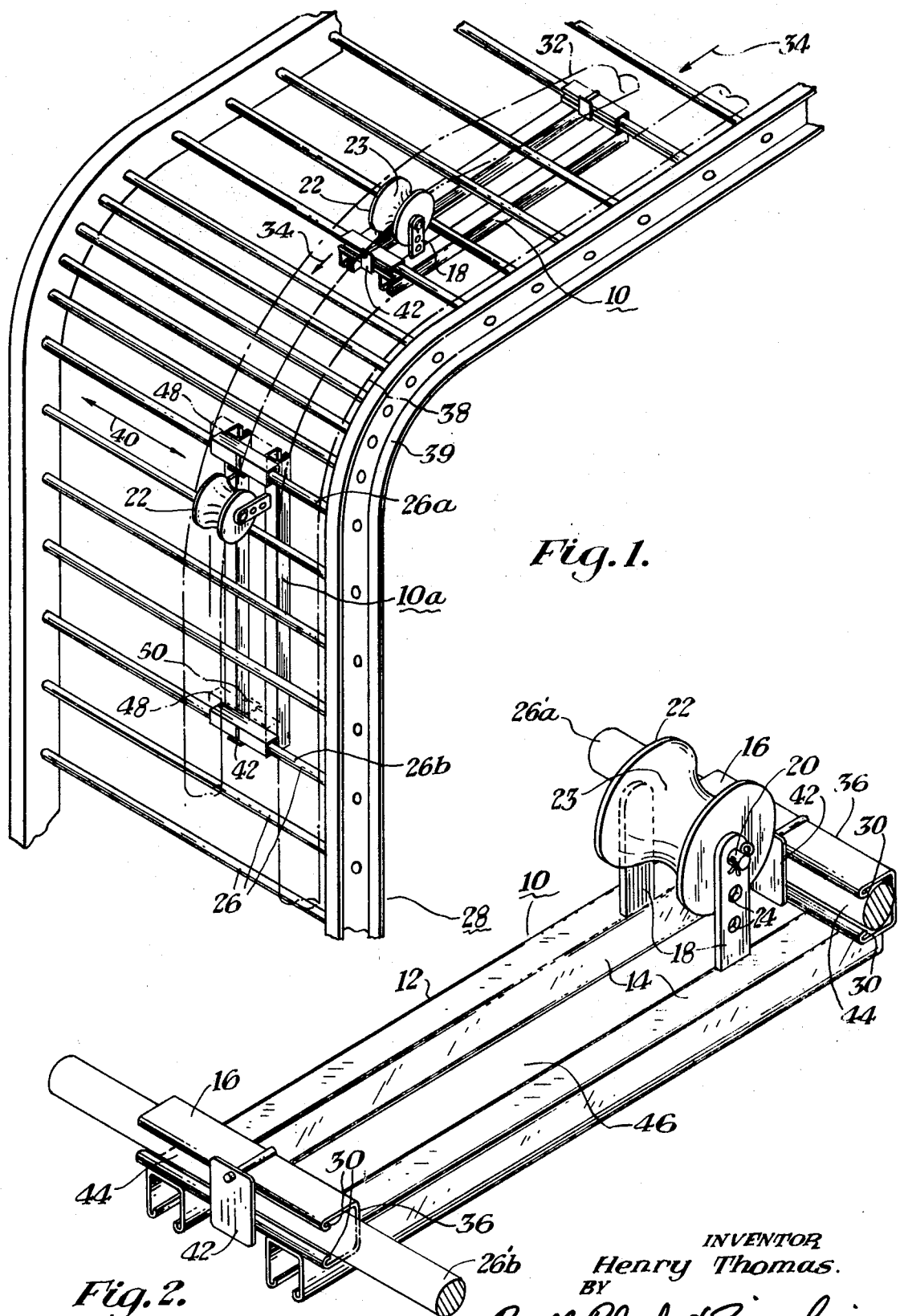

United States Patent

[11] 3,602,467

| [72] | Inventor | Henry Thomas<br>1789 Tilton Drive, Upper St., Pittsburgh, Pa. 15241 |
|---|---|---|
| [21] | Appl. No. | 852,375 |
| [22] | Filed | Aug. 22, 1969 |
| [45] | Patented | Aug. 31, 1971 |

[54] CABLE DRAW MECHANISM FOR CABLE TRAYS
14 Claims, 2 Drawing Figs.

[52] U.S. Cl. ................................................... 248/55, 248/210
[51] Int. Cl. ....................................................... H02g 3/04
[50] Field of Search ............................................ 248/55, 49, 210, 211; 182/129, 120, 121, 122

[56] References Cited
UNITED STATES PATENTS

| 1,240,521 | 9/1917 | Wendland | 248/55 X |
| 2,485,685 | 10/1949 | Armstrong | 182/121 X |
| 2,628,071 | 2/1953 | Williams | 248/210 X |
| 2,991,807 | 7/1961 | Turner | 248/55 X |
| 3,185,311 | 5/1965 | Roberts | 248/111 X |
| 3,305,100 | 2/1967 | Barbee | 211/60 |
| 3,426,988 | 2/1969 | Bradley | 248/68 X |

FOREIGN PATENTS

| 6,512,892 | 4/1967 | Netherlands | 248/68 |

Primary Examiner—Chancellor E. Harris
Attorney—Don J. Smith

ABSTRACT: I disclose a cable draw mechanism for a runged cable tray and the like, said mechanism comprising an elongated frame, rung engaging means mounted on said frame adjacent each end thereof, and a cable pulley rotatably mounted on said frame at a position intermediate said rung-engaging means, said pulley being shaped for insertion between an adjacent pair of rungs forming part of said cable tray.

INVENTOR
Henry Thomas.
BY
Buell Blenko & Ziesenheim
HIS ATTORNEYS

CABLE DRAW MECHANISM FOR CABLE TRAYS

The present invention relates to draw mechanism useful in facilitating the laying or drawing of heavy electrical cables of various sizes on supports therefor usually termed cable trays. More particularly the invention relates to a draw mechanism of the character described which offers minimal interference to adjacent or previously laid cables in the cable tray and which receives minimal interference from such cables when the draw mechanism is being utilized.

The aforementioned cable trays are widely used for supporting industrial electrical cables which may be 5 or 6 inches in diameter or larger. In a typical installation a number of electrical cables are laid side by side in the cable trays and are exceedingly difficult to handle because of their large sizes and frequently extended lengths. In laying the cables, each cable is drawn completely through the cable tray from one end to the other before the next or succeeding cable is similarly drawn or handled. The length of the cable trays as presently used may be measured in hundreds and even thousands of feet. The frictional forces developed in drawing the cables become extremely large and entail inordinate amounts of hand labor. The required drawing foreces are increased still further by various types of fittings, such as vertical and horizontal curved risers, elbows of differing radii, tees, wyes, crosses, reducers and other accessories all of which find frequent use in a typical installation.

The cable trays are usually furnished in the form of a rung or ladder construction in the form of low-profile channels in a variety of widths. In conventional practice, drawing of the electrical cables is facilitated to some extent by the use of elongated rollers mounted between adjacent rungs of the cable tray and extending entirely across the space between the side rails of the tray. The electrical cables are then successively laid by drawing them one by one across the rollers, which usually are spaced about every dozen feet or so along the length of the tray. A difficulty arises, however, in that after one or two of the heavy cables are laid in the tray, the conventional rollers cease to turn, owing to their frictional engagement with previously laid cables, when succeeding cables are pulled thereover. After the cable tray has been fully loaded with cables, it is difficult to remove these conventional rollers, which frequently are damaged in the removal operation. Because of their size and particularly their length, the conventional rollers are difficult to manufacture and to store properly, and these factors are complicated by the large number of rollers which are required.

Other conventional practices, which have been used to reduce the frictional resistance to drawing the cables axially through the cable trays, have involved the use of various types of rollers and pulleys which have utilized complex screw-clamping or other gripping arrangements to hold them in position relative to the cable tray, or alternatively the rollers or pulleys have been otherwise suspended from fixed supports independently of the cable tray. These prior practices have likewise been found to be cumbersome, inconvenient and inefficient in application.

Typical of the aforementioned fixed rollers or pulleys is the arrangement disclosed in the U.S. Pat. to Bradley et al. No. 3,426,988. This patent discloses an array of pulleys which are secured in tandem across the width of the cable tray. Although this arrangement offers considerable improvement over the practices first outlined above, which uses a continuous roller in place of each transverse array of the Bradley et al. rollers, considerable difficulty is experienced in utilizing the Bradley et al. structure. For example a large expenditure of time is required in securing and removing the individual rollers from the cable tray. Although the Bradley et al. rollers are secured at the side of the cable tray opposite from the cables laid therein, the rollers themselves must be removed from the open side of the tray by spreading or lifting or otherwise rearranging the rather heavy cables laid thereon. In view of the considerable weight and length of the larger electrical cables such removal presents a problem of no small magnitude.

I am also aware of other cable- and conduit-drawing aids which have been used in the past, for example the arrangements shown in the U.S. Pats. to Tyler No. 1,097,273 and Kearney No. 1,766,254. The Tyler arrangement is useful for laying closely spaced pipes, conduits, and the like. Aside from their inappropriate use with electrical cables, the Tyler supports likewise would involve considerable difficulty in removing them from beneath the pipes for the reasons mentioned in connection with the previous patent. The Kearney reference discloses a multiple-place cable rack for adjustably supporting one or more cables in a vertical array. Here again the referenced structure is inappropriate for large electrical cables or for use with a cable tray. Moreover, extreme difficulty would be experienced if removal of the Kearney pulleys were required.

The U.S. Pats. to Maran No. 2,174,891 and Gray No. 2,656,223 show various fixtures or attachments for use with a ladder type construction but which are obviously inappropriate for electrical cables and cable trays.

I overcome these difficulties of the prior art with the provision of a cable draw mechanism which can be mounted on and removed from a typical cable tray structure from the back or bottom of this structure. Quick attach means are employed as part of the cable draw mechanism for attaching the mechanism to the cable tray with minimal expenditure of labor. The use of supplementary hardware for making such attachment is, therefore, not required. When the draw mechanism is thus attached, it can be indexed across the width of the cable tray as successive cables are laid thereon. The necessity of employing a single continuous roller bridging the cable tray side rails or an array of rollers extending transversely between the side rails is thereby obviated.

Most importantly, the provision of a cable draw mechanism which can be removed from the back or bottom of the cable tray enables such removal to be made with little or no interference from the several cables laid in the cable tray. The indexing feature of the cable draw mechanism allows each cable to be laid in the tray without interference from adjacent cables irrespective of whether the cable is the first or the last to be laid. Finally, my draw mechanism is constructed so that it can be used with conventional cable trays having the usual rung spacings of 9, 12 or 18 inches.

I accomplish these desirable results by providing a cable draw mechanism for a runged cable tray and the like, said mechanism comprising an elongated frame, rung engaging means mounted on said frame adjacent each end thereof, and a cable pulley rotatably mounted on said frame at a position intermediate said rung-engaging means, said pulley being shaped for insertion between an adjacent pair of rungs forming part of said cable tray. Said rung-engaging means being shaped for engaging said rungs from a given same direction, and mounting means for mounting said pulley at an inserted position spaced from said rungs, said mounting means being shaped for relatively loose insertion between said rungs to permit limited longitudinal movement of said frame to engage said rungs and said rung-engaging means.

I also desirably provide a similar cable draw mechanism wherein said rung-engaging means include a pair of channel members, the open sides of said channel members facing generally in the same direction.

I also desirably provide a similar cable draw mechanism wherein said channel members each have inwardly extending reinforcing lip means, said lip means in addition at least aiding the retention of said channel members on said rungs.

I also desirably provide a similar cable draw mechanism wherein said rung-engaging means are spaced on said frame a distance equivalent to a common denominator of rung spacings in a number of cable trays having respectively differing rung spacings.

I also desirably provide a cable tray and draw mechanism therefor comprising a plurality of transverse supports forming part of said cable tray and defining spaced openings in the back or bottom thereof, said draw mechanism including an elongated frame, support engaging means mounted on said frame adjacent each end thereof, and a cable pulley mounted on said frame at a position generally between said support engaging means, said pulley being shaped for insertion through a selected one of said openings.

I also desirably provide a similar cable tray and draw mechanism wherein said tray supports and said tray openings extend uninterruptedly and transversely across said tray, and said support engaging means are shaped for sliding engagement with said tray supports respectively so that said frame can be slidably indexed across the width of said cable tray.

During the foregoing discussion, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

In the accompanying drawings I have shown certain presently preferred embodiments of the invention and have illustrated certain presently preferred methods of practicing the same, wherein:

FIG. 1 is an isometric view of a section of cable tray illustrating one form of my novel mechanism secured in vertical and horizontal dispositions; and FIG. 2 is an enlarged isometric view of the cable draw mechanism illustrated here as attached to a more or less horizontal run of cable tray.

Referring now more particularly to the drawings, an exemplary form of my cable draw mechanism 10 is illustrated in cooperation with a conventional form of cable tray 28. The draw mechanism 10 includes a framework 12 having a pair of longitudinal supports 14 joined at their ends by crosspieces 16. The supports 14 and crosspieces 16 can be fabricated in the form of channel-shaped members as illustrated. Obviously, other shapes can be utilized, although the channel configuration of the crosspieces 16 serves a further useful function as described below.

Erected from the longitudinal supports 14, desirably at the inward or apposed edges thereof, are a pair of pulley brackets 18 which are secured respectively to the upper surfaces of the longitudinal supports 14. The brackets 18 are provided with aperture means to receive a shaft or axle 20 on which pulley 22 is rotatably mounted. Desirably each of the brackets 18 is provided with an array of shaft receiving apertures 24 which are aligned transversely with the apertures on the other of the brackets, so that the pulley 22 can be mounted at a selected elevation with respect to the framework 12. It will be understood, of course, that the brackets 18 can be provided with a correspondingly different number of apertures 24, depending on the desired degree of adjustment. As described more fully below, the thus apertured brackets 18 also permit the pulley 22 to be disposed at a selected elevation relative to crossbraces, here in the formed of rungs 26, which define the floor or bottom of the cable tray.

The diameter of the pulley 22 is such that the pulley can be inserted between a pair of adjacent crossbraces or rungs or other transverse tray supports 26 of the most closely spaced arrangement conventionally available at the present time in this type of cable tray. By the same token the crosspieces 16 are spaced a distance equivalent to a common denominator of the several rung spacings presently available in cable trays of the character illustrated. In a specific application of my invention, the diameter of the pulley 22 is about 5 inches and thus can be inserted between the rungs of a tray having the closest available rung spacing. The shape of groove 23 in the pulley 22 is such that the pulley will not gouge the insulation of the largest diameter cables with which the draw mechanism will be used.

The draw mechanism is otherwise shaped for use with any of the presently available cable trays having rung spacings of 9, 12 or 18 inches, respectively.

The crosspieces 16 are spaced about 36 inches which permits their channel configurations to be slipped over and downwardly upon similarly spaced rungs of the cable tray 28 for example the rungs 26a and 26b. It will be apparent that the indicated spacing of the rungs 26a, 26b (to conform to the spacing between the crosspieces 16) will occur in any of the aforementioned, presently available cable trays irrespective of differing rung spacings. When the draw mechanism is dimensioned as shown, the pulley 22 and associated components desirably is disposed adjacent either end of the framework 12, for insertion between an appropriate, adjacent pair of rungs in any of the available rung spacings. For example, the pulley 22 can be positioned so as to be confined within a space extending about 9 inches from either crosspiece 16 or, alternatively about 6 inches from the left or right (as viewed in FIG. 2) of a transverse centerline of the framework 12.

Obviously, the diameter of the pulley 22 and the spacing between the crosspieces 16 can be varied in the event that commercially available rung spacings are varied.

When the cable draw mechanism 10 is mounted as shown upon the cable tray 28, reinforcing lips 30 provided on each of the cross-channels 16 aid in preventing inadvertent removal of the cable draw mechanism. Desirably, the cross-channels 16 are backed toward the direction from which the cable 32 is drawn (arrows 34) such that the back sides 36 of the cross-channels 16 are urged against the tray rungs 26a, 26b to lessen still further any chance of inadvertent removal of the draw mechanism 10.

As evident from FIG. 1 the cable 32 can be drawn along the length of the cable tray 28 and over pulley 22 with no interference from a previously laid cable 38. Moreover, the slidable engagement of the cross-channels 16 with the rungs 26a, 26b permits sidewise movement of the draw mechanism 10 as the cable 32 is pulled thereover such that the draw mechanism is capable of aligning itself with the pull direction of the cable 32. It will be understood, of course, that additional draw mechanisms (not shown) can be spaced along the length of the cable tray 28 to prevent the cable 32 from dragging upon the tray rungs 26 as the cable 32 is pulled along the length of the tray 28.

In this connection, it will be apparent that a most advantageous use of the draw mechanism 10 is on other than vertical tray runs, as shown in FIGS. 1 and 2, where the weight of the cables would induce considerable frictional forces, if permitted to engage the rungs directly. However, the cable tray, such as the tray 10a (FIG. 1) can be used to advantage on vertical runs, particularly when disposed adjacent a tray band 39.

As each successive cable is laid into the tray 28, the draw mechanism 10 can be indexed along the length of the rungs 26a, 26b (arrow 40) by sliding the draw mechanism 10 laterally from beneath the last laid cable, such as the cable 32, and positioning the draw mechanism to receive the succeeding cable (not shown). In those situations where the draw mechanism 10 cannot be readily slid laterally from beneath the previously laid cable, the draw mechanism 10 can be readily removed from the back of the cable tray 28 by moving the draw mechanism normally and then longitudinally of the tray to withdraw the mechanism including the pulley 22 from the back of the cable tray 28. The cable draw mechanism 10 then can be indexed to the left (as viewed in FIG. 1) by reinstalling the draw mechanism upon the cable tray rungs to receive the next cable to be laid.

For an upward cable pull (not shown) the cable draw mechanism 10 can be removed from the cable tray 28 (FIG. 1) and inverted so that the back sides 36 of the cross-channels 16 again face the direction from which the cable is to be pulled. In such case, the draw mechanism 10 can be held in place on the tray 28, until the actual cable pull is commenced, by a pair of pivoted dogs 42 pivoted respectively on the cross-channels 16 so that they can be pivoted to cover the open sides 44 of the channels after the cable draw mechanism is installed in its inverted position.

When the cable draw mechanism 10 is installed in a generally horizontal or inclined position (FIG. 2) the dogs 42 desirably are pivoted eccentrically so that they fall by gravity into their locking positions to prevent the rungs 26'a and 26'b from inadvertently passing through the cross-channel openings 44.

It will be understood, of course, that additional pulleys (not shown) can be similarly mounted along the length of the framework 12. It will also be seen that the length of the pulley 22 substantially bridges the transverse width of the space 46 between the supports 14 so that two or more of the draw mechanisms 10 can be nested for storage purposes. This is accomplished by inverting a similar draw mechanism over the draw mechanism 10 so that the pulley 22 of one mechanism is inserted or nested in the space between the longitudinal support 14 of another mechanism.

It is also contemplated that an additional cross-channel, as denoted by the chain outlined configuration 48 thereof, can be secured back to back with each of the cross-channels 16 so that the draw mechanism 10 can be secured as aforesaid for an upward cable draw (FIG. 1) without inverting the draw mechanism. In this connection, where the additional cross-members 48 are provided, the draw mechanism 10 is adapted for an upward pull by disengaging the downward facing cross-braces 16 from the rungs 26a, 26b, and engaging the upward facing crosspieces 48 with the same rungs, whereupon the draw mechanism 10 is temporarily held in place by dogs 50 similarly attached to the supplemental cross-channels 48.

From the foregoing it will be apparent that novel and efficient forms of cable draw mechanism for cable trays have been described herein. While I have shown and described certain presently preferred embodiments of the invention and have illustrated presently preferred methods of practicing the same it is to be distinctly understood that the invention is not limited thereto but may be otherwise variously embodied and practiced within the spirit and scope of the invention. For example, the invention can be adapted to differing ring spacings or assortment of ring spacings, within the context of the invention, by redimensioning the illustrative structure.

I claim:

1. A cable draw mechanism for a runged cable tray and the like, said mechanism comprising an elongated frame, rung-engaging means mounted on said frame adjacent each end thereof, a cable pulley rotatably mounted on said frame adjacent each end thereof, a cable pulley rotatably mounted on said frame at a position intermediate said rung-engaging means, said pulley being shaped for insertion between an adjacent pair of rungs forming part of said cable tray, said rung-engaging means being shaped for engaging said rungs from a given same directions, and mounting means for mounting said pulley at an inserted position spaced from said rungs, said mounting means being shaped for relatively loose insertion between said rungs to permit limited longitudinal movement of said frame to engage said rungs and said rung-engaging means respectively.

2. The combination according to claim 1 wherein said rung engaging means include a pair of channel members, the open sides of said channel members facing generally in the same direction.

3. The combination according to claim 2 wherein said frame is fabricated from a pair of spaced longitudinal supports 12 joined at their adjacent ends respectively by said channel members 16.

4. The combination according to claim 3 wherein said pulley extends transversely of said supports and substantially across the space therebetween.

5. The combination according to claim 2 wherein said channel members each have inwardly extending reinforcing lip means extending along the lengths thereof, said lip means in addition at least aiding the retention of said channel members on said rungs.

6. The combination according to claim 2 wherein a dog 42 is pivotally mounted on each of said channel members for angular displacement relative to the open side of said channel members.

7. The combination according to claim 6 wherein said dogs are eccentrically pivoted so as to be angularly displaceable by gravity across said open sides when said frame is in a more or less horizontal position.

8. A cable draw mechanism for a runged cable tray and the like, said mechanism comprising an elongated frame, rung engaging means mounted on said frame adjacent each end thereof, a cable pulley rotatably mounted on said frame at a position intermediate said rung-engaging means, said pulley being shaped for insertion between an adjacent pair of rungs forming part of said cable tray, said rung engaging means including a pair of channel members, the open sides of said channel members facing generally in the same direction, and an additional rung-engaging channel member secured back to back to each of said first-mentioned channel members.

9. The combination according to claim 4 wherein said pulley-mounting means include a pair of brackets erected respectively from said support members.

10. The combination according to claim 9 wherein said brackets are secured adjacent apposed edges respectively of said supports and are each provided with an array 24 of apertures, said arrays of apertures being transversely aligned for rotatably supporting said pulley at a selected elevation relative to said supports.

11. The combination according to claim 1 wherein rung-engaging means are spaced on said frame a distance equivalent to a common denominator of rung spacings in a number of cable trays having respectively differing rung spacings.

12. A cable tray and draw mechanism therefor comprising a plurality of transverse supports forming part of said cable tray and defining spaced openings in the back or bottom thereof, said draw mechanism including an elongated frame, support-engaging means mounted on said frame adjacent each end thereof, a cable pulley mounted on said frame at a position generally between said support-engaging means, said pulley being shaped for insertion through a selected one of said openings, said support-engaging means being shaped for engaging said supports from a given same direction, and mounting means for mounting said pulley at an inserted position spaced from said supports, said supporting means being shaped for loose insertion between said supports to permit limited longitudinal movement of said frame to engage said supports and said support engaging means respectively.

13. A cable tray and draw mechanism therefor comprising a plurality of transverse supports forming part of said cable tray and defining spaced openings in the back or bottom thereof, said draw mechanism including an elongated frame, support-engaging means mounted on said frame adjacent each end thereof, a cable pulley mounted on said frame at a position generally between said support-engaging means, said pulley being shaped for insertion through a selected one of said openings, said tray supports and said tray openings extending uninterruptedly and transversely across said tray, said draw mechanism being substantially narrower than said cable tray, and said support-engaging means being spaced similarly with respect to selected ones of said tray supports and being shaped for sliding engagement with said tray supports respectively so that said frame can be slidably indexed across the width of said cable tray.

14. The combination according to claim 11 wherein said pulley is so positioned along the length of said frame as to be insertable between an adjacent pair of rungs irrespective of a particular size of said rung spacings.